(12) United States Patent
Henry

(10) Patent No.: US 9,165,319 B1
(45) Date of Patent: Oct. 20, 2015

(54) VEHICLE INFORMATION DELIVERY AND MANAGEMENT SYSTEM AND METHOD

(71) Applicant: iBoss Innovations LLC, Grand Prairie, TX (US)

(72) Inventor: Hanson Henry, Grand Prairie, TX (US)

(73) Assignee: iBoss Innovations LLC, Grand Prairie, TX (US)

( * ) Notice: Subject to any disclaimer, the term of this patent is extended or adjusted under 35 U.S.C. 154(b) by 0 days.

(21) Appl. No.: 14/523,929

(22) Filed: Oct. 26, 2014

Related U.S. Application Data

(60) Provisional application No. 61/986,780, filed on Apr. 30, 2014.

(51) Int. Cl.
 *G06Q 30/00* (2012.01)
 *G06Q 30/06* (2012.01)

(52) U.S. Cl.
 CPC ................... *G06Q 30/0623* (2013.01)

(58) Field of Classification Search
 CPC ............ G06Q 30/0601; G06Q 30/0623
 USPC ........ 705/26.1, 26.2, 26.25, 26.3, 26.35,
  705/26.4, 26.41–26.44, 26.5, 26.7, 26.8,
  705/26.81, 26.82, 26.9, 27.1, 27.2
 See application file for complete search history.

(56) References Cited

U.S. PATENT DOCUMENTS

| | | | |
|---|---|---|---|
| 3,665,397 A * | 5/1972 | Di Napoli et al. | 340/5.42 |
| 7,296,736 B2 * | 11/2007 | Yamagiwa | 235/382 |
| 7,367,049 B1 * | 4/2008 | Robinson et al. | 726/2 |
| 7,962,369 B2 * | 6/2011 | Rosenberg | 705/26.1 |
| 8,393,541 B2 | 3/2013 | Naumovsky | |
| 8,781,910 B2 | 7/2014 | McRae et al. | |
| 8,831,279 B2 | 9/2014 | Rodriguez et al. | |
| 2002/0073000 A1 | 6/2002 | Sage | |
| 2002/0156553 A1 * | 10/2002 | Read | 701/1 |
| 2005/0086070 A1 | 4/2005 | Engelman | |
| 2006/0259353 A1 * | 11/2006 | Gutmann | 705/13 |
| 2008/0021714 A1 | 1/2008 | Kraez et al. | |
| 2010/0228405 A1 * | 9/2010 | Morgal et al. | 701/2 |
| 2011/0313937 A1 * | 12/2011 | Moore et al. | 705/307 |

(Continued)

FOREIGN PATENT DOCUMENTS

| | | |
|---|---|---|
| GB | 2473837 | 3/2011 |
| JP | 2009176261 | 8/2009 |

(Continued)

OTHER PUBLICATIONS

Jason Stoffer "ATM-type machine could change the car-repair process", Crain's Detroit Business 15.28 (Jul 12, 1999): 12. Retrieved from ProQuest Dialog.*
International Search Report and Written Opinion; Application No. PCT/US2015/028582; Jul. 27, 2015.

*Primary Examiner* — Naeem Haq
(74) *Attorney, Agent, or Firm* — James L. Baudino

(57) ABSTRACT

A technique and method for vehicle information delivery and management includes: receiving, by a management module of a service provider manager associated with a service provider, a notification from an application executing on a client device of an end user that vehicle data corresponding to a vehicle being viewed by the end user on a premises of the service provider has been displayed to the end user; storing, by the management module, the vehicle data corresponding to the viewed vehicle; and storing, by the management module, a time that the vehicle was viewed by the end user.

10 Claims, 9 Drawing Sheets

(56) References Cited

U.S. PATENT DOCUMENTS

2012/0232995 A1 9/2012 Castro et al.
2014/0181691 A1* 6/2014 Poornachandran et al. .. 715/753
2014/0309842 A1 10/2014 Jefferies et al.

FOREIGN PATENT DOCUMENTS

KR 1020110137061 12/2011
KR 1020140031418 3/2014

* cited by examiner

VEHICLE INFORMATION DELIVERY AND MANAGEMENT SYSTEM AND METHOD

BACKGROUND

A vehicle information disclosure sheet, which can also commonly be referred to as a Monroney sticker, is typically affixed to a side window of a vehicle. Generally, a vehicle information disclosure sheet includes information such as the make, model and year of the vehicle, the vehicle identification number (VIN), the estimated fuel efficiency of the vehicle, a list of standard and optional features included in the vehicle, the manufacturer suggested retail price (MSRP) of the vehicle and other information pertaining to the vehicle. An addendum may also accompany and/or be affixed to the window of the vehicle near or adjacent the Monroney sticker that includes additional, locally-installed optional features available on the vehicle (e.g., dealer/seller add-ons, such as window tinting, wheel locks, upholstery protection, etc.) including their respective prices.

When a potential buyer views the vehicle information disclosure sheet and wishes to obtain additional information about a specific vehicle, the potential buyer usually will need to speak to a sales representative. However, this can be time consuming, especially if a sales representative is not readily available. Also, a potential buyer may be reluctant to speak to a sales representative for fear of receiving an aggressive sales pitch. In addition, when the dealer lot is closed, no sales representatives will be present to speak with the potential buyer.

BRIEF SUMMARY

According to one aspect of the present disclosure a method and technique for vehicle information delivery and management is disclosed. The method includes: receiving, by a management module of a service provider manager associated with a service provider, a notification from an application executing on a client device of an end user that vehicle data corresponding to a vehicle being viewed by the end user on a premises of the service provider has been displayed to the end user; storing, by the management module, the vehicle data corresponding to the viewed vehicle; and storing, by the management module, a time that the vehicle was viewed by the end user.

According to another aspect of the present disclosure, a computer program product for vehicle information delivery and service is disclosed. The computer program product comprises a computer readable storage medium having program instructions embodied therewith, the program instructions executable by a processor of a client device to cause the processor to perform a method comprising: scanning for a wireless signal emitted by an identification (ID) object associated with a vehicle; responsive to detecting the wireless signal, determining vehicle data corresponding to the vehicle; displaying the vehicle data to the end user; and transmitting an indication that the vehicle is being viewed by an end user of the client device to a service provider system.

According to yet another aspect of the present disclosure, a system for vehicle information delivery and service is disclosed. The system includes a service provider manager comprising a processor unit and a service management module, the service management module executable by the processor unit to: receive a notification from an application executing on a client device of an end user that vehicle data corresponding to a vehicle being viewed by the end user has been displayed to the end user; and notify at least one employee of a service provider of the notification.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
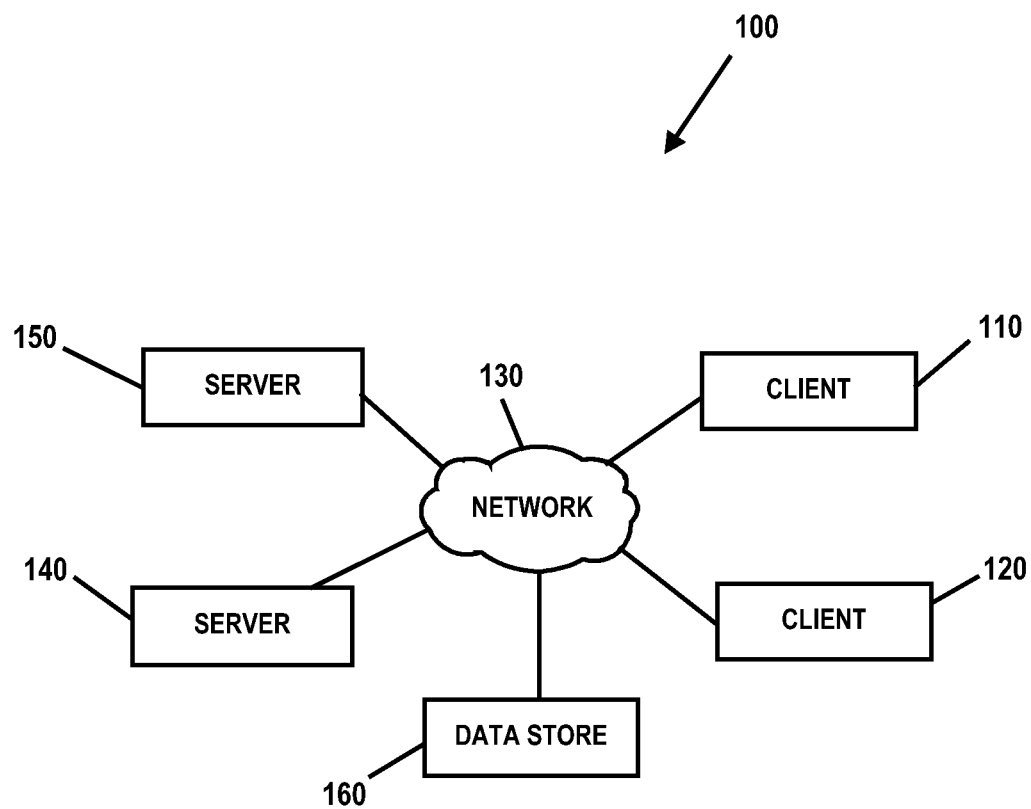
FIG. 1 is an embodiment of a network of data processing systems in which the illustrative embodiments of the present disclosure may be implemented.

Embodiments of the present disclosure provide a method, system and computer program product for vehicle information delivery and management. Embodiments of the present disclosure enable the efficient management of vehicle information delivery and service. For example, embodiments of the present disclosure enable an end user, using an application residing and executing on a portable electronic device, to retrieve and store electronic versions of Monroney and/or other vehicle information corresponding to a desired or "viewed" vehicle, including in a desired language, thereby enabling the Monroney sticker to be removed and/or omitted from the vehicle (which may decrease the likelihood of vehicular accidents during test drives due to impaired visibility from the Monroney sticker). The end user, utilizing the application, may store a variety of types of information for various vehicles (e.g., from one or more vehicle service providers/dealerships) for later evaluation/retrieval. Further, modules/applications residing on and/or made available to various personnel at the service provider/dealership enables such personnel to more efficiently respond to and provide service to the end user/customer. For example, in some embodiments, personnel most closely matching various criteria for responding to an end user/customer request can be identified and selected. Further, data acquired corresponding to which vehicles have been viewed (during and/or after normal business hours) by end users/customers may better enable the dealership to gauge consumer interest in particular vehicles. Thus, for example, in some embodiments, the method and technique includes: receiving, by a management module of a service provider manager associated with a service provider, a notification from an application executing on a client device of an end user that vehicle data corresponding to a vehicle being viewed by the end user on a premises of the service provider has been displayed to the end user; storing, by the management module, the vehicle data corresponding to the viewed vehicle; and storing, by the management module, a time that the vehicle was viewed by the end user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
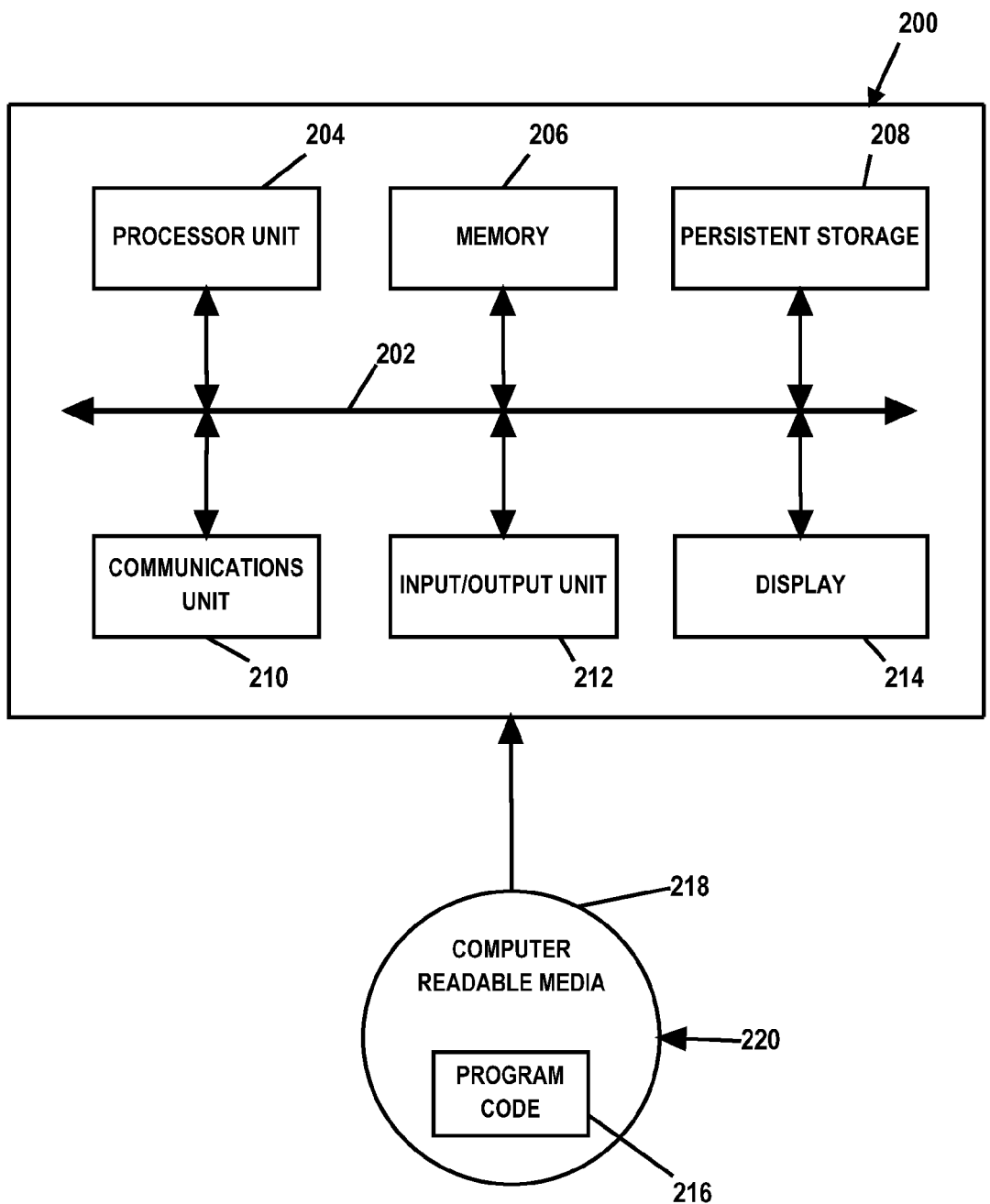
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for vehicle information delivery and management according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
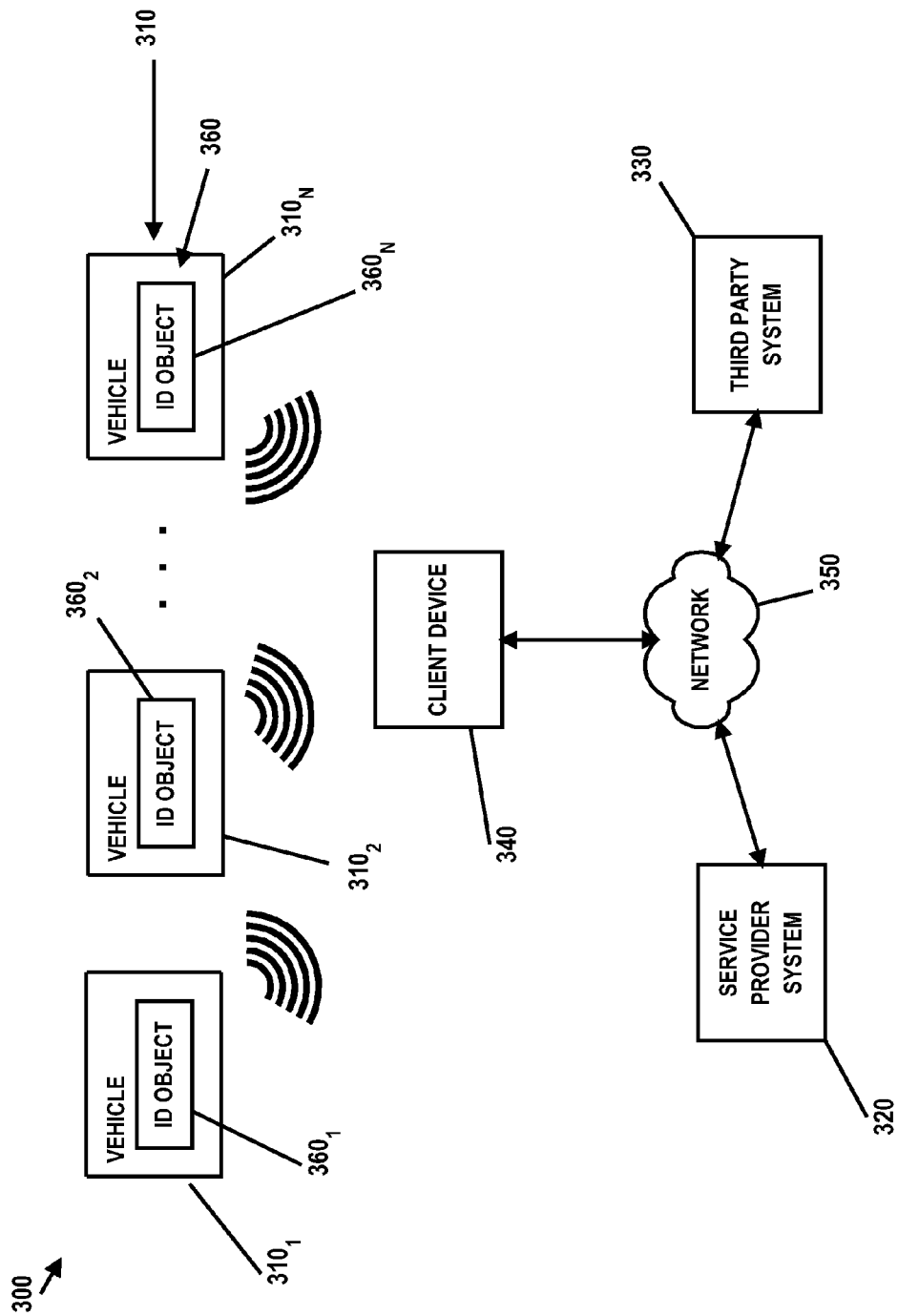
FIG. 3 is a diagram illustrating an embodiment of a distributed computing environment in which illustrative embodiments of a system for vehicle information delivery and management according to the present disclosure may be implemented.

FIG. 3 is an illustrative embodiment of a system 300 for vehicle information delivery and management. Various components of system 300 may be implemented on data processing systems or platforms such as, but not limited to, servers 140 and/or 150, clients 110 and/or 120, or at other data processing system locations. In FIG. 3, system 300 includes a number of vehicles 310 (e.g., vehicles $310_1$-$310_n$). Vehicles 310 may comprise any type of vehicle such as, but not limited to, automobiles, trucks, vans, motorcycles, boats, campers, recreation vehicles, etc. It should be understood that embodiments of the present invention may also be applied to other types of devices/goods/items instead of or in addition to vehicles (e.g., homes/apartments/condos for sale/lease, consumer electronic equipment, or other types of items where additional information about the item, or an alternate mechanism for providing information about the item, may be desired). In the illustrated embodiment, system 300 also includes a service provider system 320, a third party system 330, a client device 340, and a network 350 communicatively couplable to service provider system 320, third party system 330, and/or client device 340. Network 350 may comprise the Internet, an intranet, a local area network (LAN), a wide area network (WAN), or any type of wired/wireless network (e.g., a wireless telephone/data network). Service provider system 320 and third party system 330 may comprise any type of local and/or remote data processing system (e.g., locally and/or remotely located (e.g., cloud-based systems) computing platforms, such as server 140/150 and/or clients 110/120).

In the illustrated embodiment, service provider system 320 may comprise a data processing system of a vehicle seller (e.g., an automobile dealership), and third party system 330 may comprise a data processing system of a vehicle manufacturer, vehicle safety resource, etc. However, it should be understood that systems 320 and/or 330 may comprise computing platforms associated with other entities. Client device 340 may comprise any type of portable computing device such as, but not limited to, a telephone/smartphone, laptop computer, a tablet computer, a personal digital assistant, or other types of portable data processing system capable of presenting/displaying information to an end user thereof.

In FIG. 3, each vehicle 310 includes an identification (ID) object 360 (e.g., $360_1$-$360_n$) associated therewith. In some embodiments, ID object 360 comprises a beacon object for emitting/transmitting a wireless signal for transmitting data associated with a respective vehicle 360 to client device 340 (e.g., using radio-frequency identification (RFID) signals/tags, Bluetooth low-energy (BLE) wireless technology (e.g., an IBEACON) or other type of wireless signal/technology). ID object 360 may be located within/inside vehicle 310, on the vehicle 310, or may be otherwise associated with a respective vehicle 310. ID object 360 may be programmed (e.g., by dealership personnel or other individuals) to contain and/or configured to store thereon information corresponding to an associated/linked vehicle 310 (e.g., Monroney information, dealer addendum information, etc.). In some embodiments, ID object 360 may comprise a barcode (e.g., a universal product code (UPC) barcode, a matrix or two-dimensional barcode (e.g., a quick response (QR) code), etc.) or other type of machine-readable indicia that, when read, may comprise information associated with a respective linked vehicle 310 and/or may direct client device 340 to information associated with a respective vehicle 310 (e.g., a link to a dealership website).

As will be described in greater detail below, client device 340 may comprise hardware, software and/or a combination of the foregoing, that may scan/detect/receive a signal from ID object 360 when in close proximity thereto (or read an ID object 360 (e.g., a barcode) in some embodiments) and automatically display data associated with a respective vehicle 310. For example, in some embodiments, ID object 360 may be programmed to contain and transfer to client device 340 information typically present on a Monroney sticker and/or dealer addendum, thereby displaying to the end user of client device 340 an electronic version of the Monroney sticker/addendum.

Figure 4:
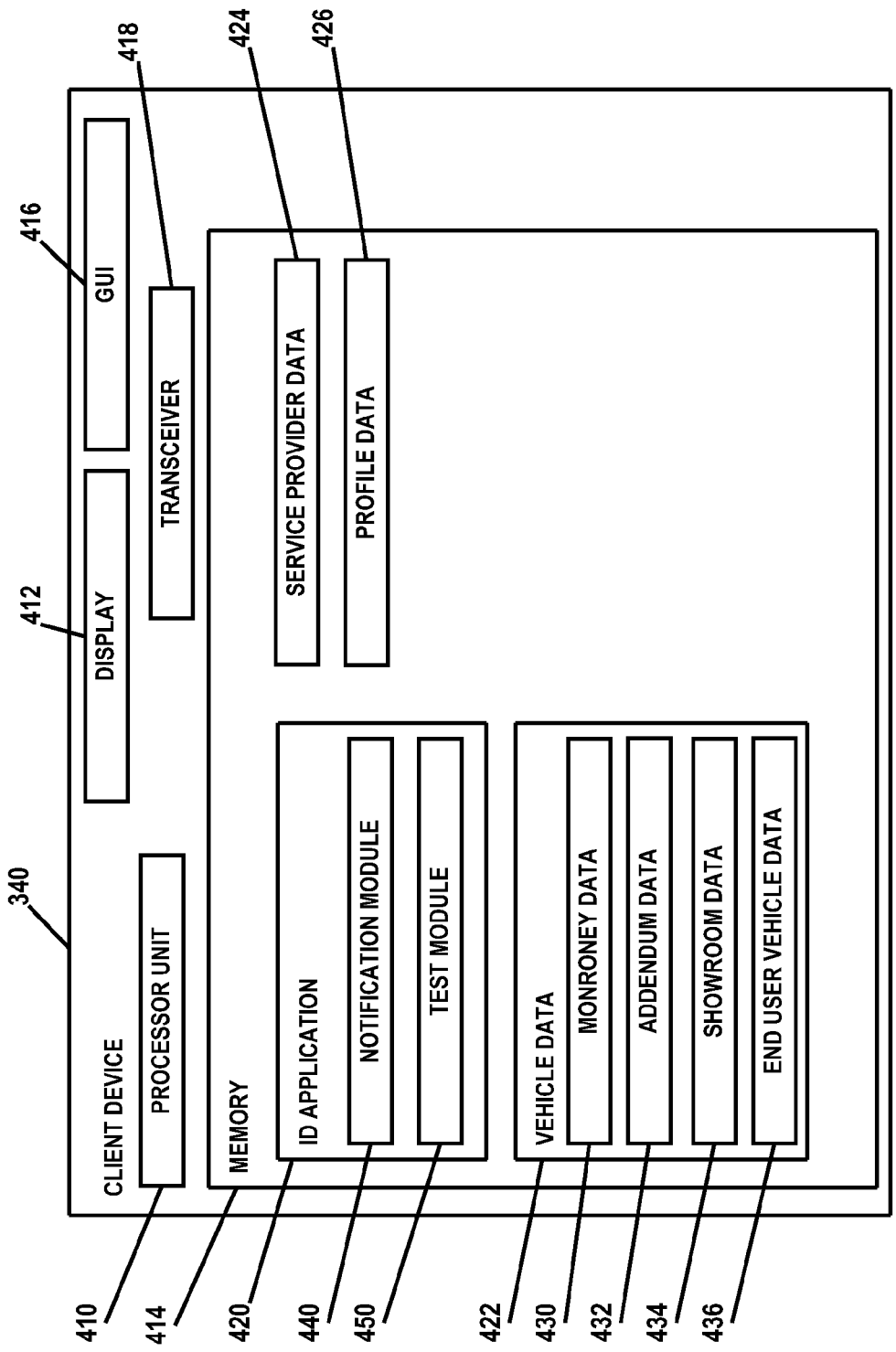
FIG. 4 is a diagram illustrating an embodiment of a client device of a system for vehicle information delivery and management according to the present disclosure.

FIG. 4 is a diagram illustrating an embodiment of client device 340 according to the present invention. In FIG. 4, client device 340 includes a processor unit 410, a display 412 (e.g., a liquid crystal display (LCD) or other type of device for displaying information), a memory 414, a graphical user interface (GUI) 416 and a transceiver 418. Transceiver 418 may comprise any type or device/module for receiving and/or transmitting wireless signals/communications. In the illustrated embodiment, memory 414 includes an ID application 420, vehicle data 422, service provider data 424, and profile data 426. GUI 416 may comprise an interface displayable on display 412 for enabling an end user of client device 340 to view/select various functions/features available via ID application 420.

ID application 420 is configured to scan/detect/read/receive a signal from ID object 360 (FIG. 3) and perform various functions in response thereto. For example, in some embodiments, ID application 420 is configured to receive a signal from ID object 360, obtain information associated with a respective vehicle 310 associated with the ID object 360, and display the information to an end user via display 412. In some embodiments, ID application 420 may be configured to read/decode ID object 360 in the form of a barcode and display the decoded information to an end user via display 412. ID application 420 may be implemented in any suitable manner using known techniques that may be hardware-based, software-based, or some combination of both. For example, ID application 420 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In FIG. 4, vehicle data 422 includes Monroney data 430, addendum data 432, showroom data 434 and end user vehicle data 436. Monroney data 430 may comprise information typically included on a Monroney sticker affixed to a particular vehicle 310. Addendum data 432 may comprise information associated with additional, locally-installed optional features on the respective vehicle 310 (e.g., dealer/seller add-ons, such as window tinting, wheel locks, upholstery protection, etc.) including their respective prices. Showroom data 434 may comprise information associated with one or more vehicles 310 stored by an end user for later retrieval. For example, in some embodiments, the end user may visit multiple dealerships (or view multiple, different vehicles 310 at a single dealership) and store in the end user's "showroom" Monroney data 430 and addendum data 432 for each desired vehicle. Thus, if the end user would like to later reevaluate a particular vehicle, the end user may select a GUI 416 option to view vehicles stored in the end user's "showroom." In some embodiments, ID application 420 may be configured to compare the different vehicles (or vehicle information) as stored as showroom data 434 to evaluate differences between the "showroom" vehicles. Additionally, in some embodiments, ID application 420 may be configured to provide a translated version of Monroney data 430 and addendum data 432. For example, in some embodiments, GUI 416 may be configured with various language options such that, in response to a selection of a particular language option (e.g., Spanish), Monroney data 430 and addendum data 432 are translated and displayed by ID application 420 in the selected/desired language. In some embodiments, ID object 360 may also and/or alternatively be configured/programmed to include Monroney data 430 and addendum data 432 in different languages.

End user vehicle data 436 may comprise information associated with one or more vehicles owned by an end user (e.g., owned by an end user of client device 340 that may be potential trade-in vehicles on a purchase of a new vehicle 310 (i.e., new to the end user)). For example, the end user may use ID application 420 to enter and store information regarding vehicles currently owned by the end user (e.g., make, model, year, color, options, mileage, etc.). In some embodiments, the end user may enter a VIN number, and ID application 420 may be configured to automatically connect to and/or communicate with a third party site (e.g., third party system 330 (FIG. 3)) to gather information about the vehicle based on the VIN number.

Service provider data 424 may comprise information associated with a provider of vehicles 310 (e.g., a seller/dealership). Service provider data 424 may comprise general information about the dealership (e.g., business hours, contact phone number/emails, etc.), a logo of the dealership, and, as will be described in greater detail below, information associated with contacting dealership representatives in response to a selection of various GUI 416 options by the end user. In some embodiments, ID application 420 is configured to obtain service provider data 424 on a real time, or near real time basis, based on a proximity of client device 340 to a particular dealership. For example, in some embodiments, in response to an end user of client device 340 launching ID application 420, ID application 420 may automatically connect to and/or otherwise communicate with a data processing system (e.g., via transceiver 418) of a dealership in close (or closest) proximity thereto and update service provider data 424 based on the received information. Thus, in some embodiments, service provider data 424 may be automatically updated and displayed based on proximity to a respective/participating dealership. Profile data 426 may comprise information related to the end user of client device 340 (e.g., name, address, contact information, etc.).

Figure 5:
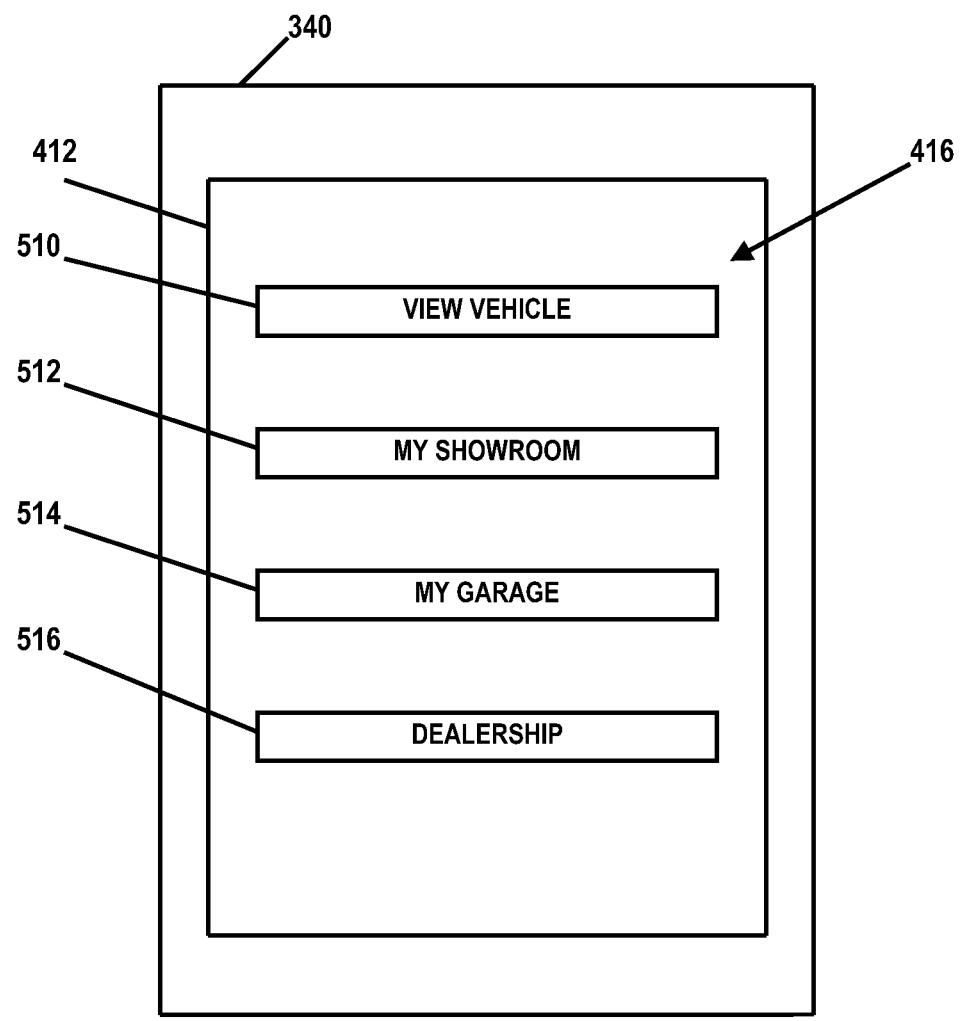
FIG. 5 is a diagram illustrating an embodiment of a graphical user interface displayable on the client device of FIG. 4 in a system for vehicle information delivery and management according to the present disclosure.

FIG. 5 is a diagram illustrating an embodiment of a display of GUI 416 according to the present disclosure. In FIG. 5, GUI 416 includes various selectable/clickable icons/buttons such as a "view vehicle" 510 icon, a "my showroom" 512 icon, a "my garage" 514 icon, and a "dealership" 516 icon. View vehicle 510 icon, in response to being selected, may enable the user to view information associated with one or more vehicles 310 detected/identified by ID application 420. For example, in some embodiments, ID application 420 may detect and/or receive signals from one or more ID objects 360 associated with respective vehicles 310 located in close proximity to client device 340. If only a single vehicle 310 is detected/identified, ID application 420 may automatically display vehicle data 422 (e.g., Monroney data 430 and addendum data 432) for the detected vehicle 310. If multiple vehicles 310 are detected, ID application 420 may display an image and/or brief summary of each detected/identified vehicle 310 and prompt the user for a selection of a particular vehicle 310. For example, for vehicles 310 located in close proximity to each other, ID application 420 may detect and/or receive signals from multiple respective ID objects 360. In response to a selection of a particular vehicle 310, ID application 420 displays vehicle data 422 (e.g., Monroney data 430 and addendum data 432) for the selected vehicle 310. The view vehicle 510 icon may also cause additional icons/options to be displayed/selected by the user, such as an icon that would connect the end user to a manufacturer website to obtain additional information about the vehicle, a link to third party vehicle safety information (e.g., the IIHS), a screen depicting current incentives/rebates available on the vehicle, a payment calculator, etc.).

ID application 420 may also be configured to display additional search options for selection and/or input by an end user of client device 340. For example, in some embodiments, a GUI 416 screen/display page may include an input option for the end user to input a VIN number, stock number, scan a barcode, or other feature that may be used to located and/or identify a particular vehicle 310. As an example, an end user may view a dealership website while at home and identify a vehicle that the end user would like to see in person at the dealership. The end user may enter/store a VIN number, stock number, or other identifying information in ID application 420 that the end user obtained from the dealership website. Upon visiting the dealership or being on the dealership premises, the end user may select the view vehicle 510 icon as well as select an option and/or information corresponding to the previously stored VIN number/stock number. ID application 420 may be configured to notify the end user (e.g., via a display signal, audio signal, etc.) in response to detecting a signal from a corresponding ID object 360 that matches the stored search criteria (e.g., matching the VIN number/stock number stored by the end user). Thus, in this example, the end user may walk along a row of vehicles 310 and be notified when a vehicle 310 matching the searched for vehicle criteria has been detected/located. Thus, it should be understood that ID application 420 may be configured with various/different search options to enable the end user to locate and identify a particular vehicle 310. As indicated above, the view vehicle 510 icon may also comprise a GUI 416 screen/display that enables the end user to input/scan a barcode (e.g., affixed and/or located on/in a particular vehicle 310) to automatically display Monroney data 430 and addendum data 432 for the selected vehicle 310. ID application 420 may also store the applicable Monroney data 430 and addendum data 432 for the viewed vehicle 310 as showroom data 434 in response to the end user selecting an "add to my showroom" icon.

ID application 420 may also be configured to display showroom data 434 in response to a selection by the end user of the my showroom 512 icon. For example, in response a selection of the my showroom 512 icon, Monroney data 430 and addendum data 432 for vehicles 310 previously viewed and stored as showroom data 434 may be displayed by ID application 420. ID application 420 may also be configured to provide and display a side-by-side comparison of vehicles 310 selected from the showroom data 434.

ID application 420 may also be configured to display end user vehicle data 436 in response to a selection by the end user of the my garage 514 icon. For example, in some embodiments, ID application 420 may, in response to a selection of the my garage 514 icon, display vehicle information of end user-owned vehicles previously stored as end user vehicle data 436 and/or enable the end user to enter/store vehicle information to be stored as end user vehicle data 436. In some embodiments, ID application 420 may be configured to scan and/or receive input of a VIN number and automatically access a third party system (e.g., system 330) to obtain and automatically populate various fields of information (e.g., make, model, year, etc.) and enable the end user to enter other types of information (e.g., mileage). ID application 420 may then store the entered information as end user vehicle data 436. End user vehicle data 436 may also include image files and/or other types of information that may be displayed to enable a dealership to evaluate an end user-owned vehicle for a potential trade-in value even if the end user-owned vehicle is not presently onsite at the dealership. In some embodiments, vehicle information of a vehicle stored as showroom data 434 may be automatically stored as end user vehicle data 436 as a result of the end user purchasing such vehicle. For example, in some embodiments, information associated with one of the vehicles 310 previously stored as showroom data 434 (e.g., that the end user is considering purchasing) may be automatically transferred to end user vehicle data 436 in response to a selection of an input icon in the "my showroom" screen (e.g., a selection icon displaying "purchased"). Correspondingly, if a vehicle identified and stored as end user vehicle data 436 is used as a trade-in on a new vehicle purchase, ID application 420 may automatically purge/delete the vehicle information from end user vehicle data 436 (e.g., in response to a selection by the end user of a "traded in" icon on an end user-owned vehicle screen of GUI 416). As will be described in greater detail below, the addition or deletion of vehicle information in showroom data 434 and/or end user vehicle data 436 as described above may be accomplished without end user action (e.g., action performed by the dealership may be automatically communicated to ID application 420 to, for example, move a "showroom" vehicle to the "my garage" of the end user in response to a purchase, and delete a vehicle from the "my garage" of the end user in response to a trade-in of the vehicle).

Figure 6:
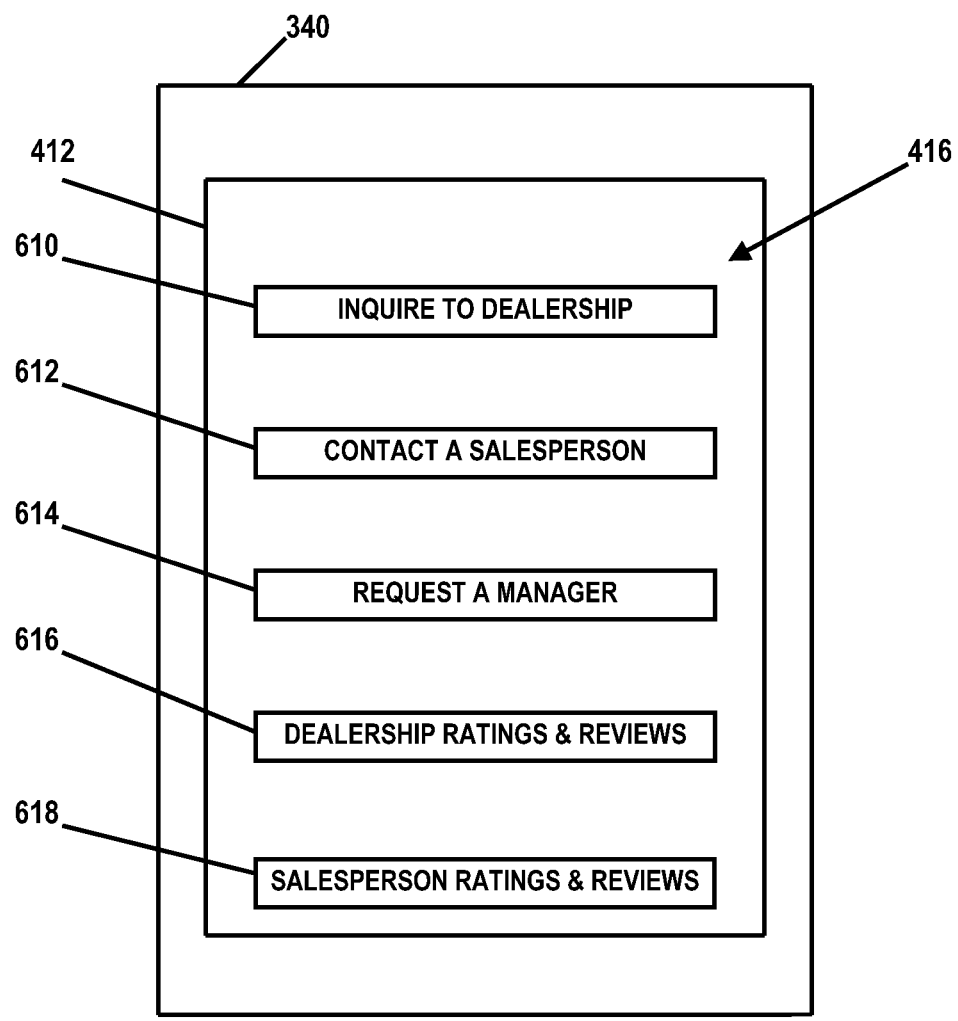
FIG. 6 is a diagram illustrating another embodiment of a graphical user interface displayable on the client device of FIG. 4 in a system for vehicle information delivery and management according to the present disclosure.

ID application 420 may also be configured to display one or more selectable options to the end user to communicate with the dealership in response to a selection by the end user of the dealership 516 icon. For example, FIG. 6 is a diagram illustrating an embodiment of a display of GUI 416 in response to selection of the dealership 516 icon of FIG. 5 according to the present disclosure. In FIG. 6, GUI 416 includes various selectable/clickable icons/buttons such as an "inquire to dealership" 610 icon, a "contact a salesperson" 612 icon, a "request a manager" 614 icon, and a "dealership ratings & review" 616 icon, and a "salesperson ratings & review" 618 icon. The dealership ratings & review 616 icon and the salesperson ratings & review 618 icon may automatically link ID application 420 to a third party or dealership site providing ratings and reviews of the respective dealership and salesperson. The inquire to dealership 610 icon, when selected, may cause ID application 420 to communicate with service provider system 320 (e.g., the dealership) to enable the end user to contact/send an inquiry to the dealership. For example, ID application 420 may enable the end user to send an email, text, phone call, leave a voice message, open a chat dialog, or other action with the particular dealership. The contact a salesperson 612 icon and request a manager 614 icon, when selected, causes ID application 420 to communicate with system 320 to contact a respective salesperson or manager of the dealership. This contact request may be in the form of a telephone contact, text, email, chat dialog, or may cause a signal/alert/notice to be given to a respective salesperson/manager that an end user (customer) onsite at the dealership would like an in-person visit with the respective salesperson/manager. As indicated above in connection with other options, ID application 420 may also enable a selection of language, gender, ethnicity, or other characteristic to be selected/identified by the end user such that a salesperson/manager matching (or closest to matching) the desired criteria may be notified of the desired contact request.

Referring to FIG. 4, ID application 420 also includes a notification module 440 and a test module 450. Notification module 440 may be used to provide various types of information gathered/stored by ID application 420 to system 320 and/or system 330, automatically and/or in response to end user input. For example, notification module 440 may be used to initiate communications with system 320 in response to request to contact a salesperson/manager. Notification module 440 may also be configured to automatically communicate to system 320 the various vehicles 310 selected/viewed by an end user/customer. For example, in some embodiments, in response to ID application 420 detecting a signal from a respective ID object 360 and displaying vehicle data 422 based on the ID object 360 detected, notification module 440 may automatically communicate the corresponding information about the respective vehicle 310 (along with other information) to system 320. The information communicated to system 320 may include the identity (or identifier) of the vehicle, the date/time the action occurred, information about the end user/customer (e.g., profile data 426), etc. In some embodiments, notification module 440 communicates the information in real time (or near real time) to enable the dealership to better service a potential customer (e.g., by alerting the dealership of what vehicle is being evaluated, the date/time of evaluation, the location of the vehicle on the premises, etc.). It should be understood that the types of information transmitted by ID application 420 to service provider system 320 and/or third party system 330 may vary, and the actions and/or functions that invoke the transmission may vary.

Test module 450 may be configured to simulate a test drive (e.g., provide a virtual test drive) of a selected vehicle. For example, in some embodiments, as part of the GUI 416 screen in a "view vehicle" screen, the end user may select a "virtual test drive" icon. In response to the selection of the virtual test drive icon, test module 450 may provide an interactive multimedia environment for the end user to learn additional information about the vehicle (e.g., experience a series of interactive views/media presentations of the vehicle and enable the end user to visually and/or audibly experience various aspect of the vehicle). For example, test module 450 may be used to download and/or stream various multimedia files to represent a test drive of the vehicle. The multimedia files may simulate a test drive by providing a view to the end user looking out through the front window (as if driving the vehicle), provide sounds of the engine, in-cabin chimes/alerts, the display and use of in-cabin controls, changes in speed, etc., to provide the end user with a sensory experience simulating a test drive of the vehicle. Test module 450 may also be configured to receive user input selections on various displayed screens of the test drive images to enable various information and/or option selections to be engaged (e.g., responses to push button controls, changes in engine sound in response a desired increase in acceleration, audio output of a navigation system, etc.).

Figure 7:
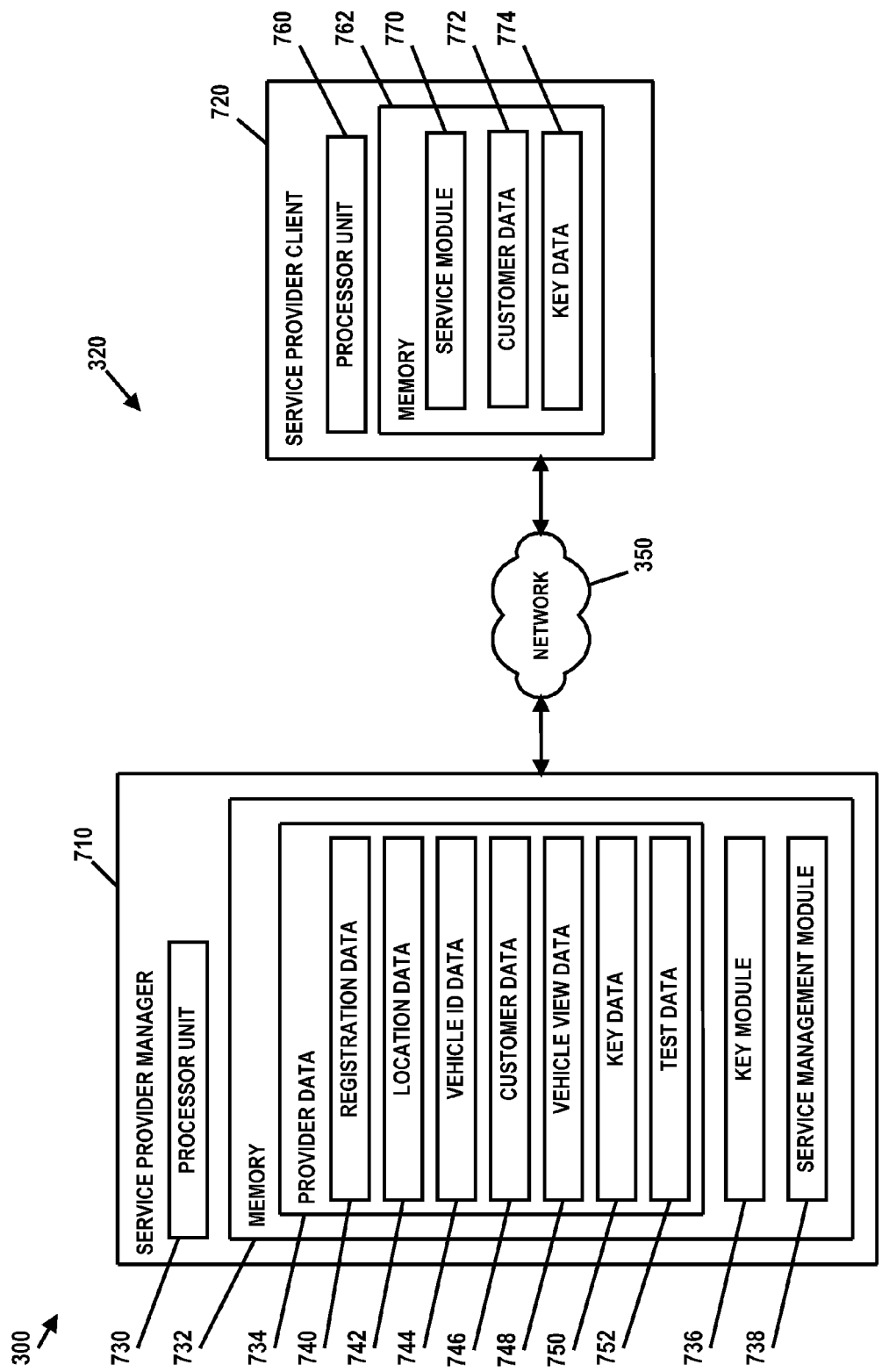
FIG. 7 is a diagram illustrating an embodiment of a service provider system for vehicle information delivery and management according to the present disclosure.

FIG. 7 is a diagram illustrating an embodiment of service provider system 320 according to the present disclosure. System 320 may be implemented on data processing systems or platforms such as, but not limited to, servers 140 and/or 150, clients 110 and/or 120, or at other data processing system locations. In an example embodiment, system 320 may be implemented by a vehicle dealership and connected to network 350. In the illustrated embodiment, system 320 comprises a service provider manager 710 and a service provider client 720. Service provider manager 710 may comprise hardware, software and/or a combination of the foregoing to provide management functionality for a vehicle dealership (e.g., employed by management personnel at the dealership). Service provider client 720 may comprise hardware, software and/or a combination of the foregoing to provide non-management functionality for a vehicle dealership (e.g., employed by a salesperson at the dealership) or used by managers to access/utilize management information available from manager 710. However, it should be understood that various management or non-management roles and/or functionality may be shared between managers and non-managers at the dealership or made available to managers and non-managers differently as described herein.

In the illustrated embodiment, service provider manager 710 comprises a processor unit 730 and a memory 732. Memory 732 includes provider data 734, a key module 736 and a service management module 738. Provider data 734 may comprise various information associated with a service provider (e.g., a vehicle dealership) such as, but not limited to, registration data 740, location data 742, vehicle ID data 744, customer data 746, vehicle view data 748, key data 750, and test data 752. As will be described in greater detail below, key module 736 may be used to monitor the availability of, to reserve, to dispense, etc., a key (or ignition-enabling device) for the operation of a vehicle (e.g., to enable a test drive). Service management module 738 is configured to acquire various types of information associated with vehicles 310, end users/customers, employees of the dealership, etc. Service management module 738 may also be used to respond to requests for contact by a customer (e.g., via the "contact a salesperson" 612 icon and/or "request a manager" 614 icon of ID application 420), selection/notification of certain employees in response to a request for contact by a customer, monitoring/tracking the locations of employees on the dealership premises available to assist a customer, and/or other functions as described herein. Key module 736 and/or management module 738 may be implemented in any suitable manner using known techniques that may be hardware-based, software-based, or some combination of both. For example, key module 736 and/or management module 738 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

Registration data 740 may comprise information associated with various managers/salespersons/employees currently onsite at the dealership and/or ready/available to assist customers. For example, as will be described in greater detail below, a manager/salesperson/employee utilizing client 720 may register with service management module 738 to enable the location of the manager/salesperson/employee to be identified on the premises of the dealership and/or otherwise enable the manager/salesperson/employee to be contacted/designated in response to a customer requesting assistance (e.g., via the "contact a salesperson" 612 icon and/or "request a manager" 614 icon of ID application 420). Registration data 740 may also include information associated with various characteristics of the registered employee (e.g., languages spoken, familiarity with certain vehicle types, gender, etc.). Registration data 740 may also indicate the availability status of an employee of the dealership to assist a customer (e.g., on-premises but unavailable (e.g., currently with a customer)).

Location data 742 may comprise information associated with the location of various vehicles 310 on the dealership premises and/or location of managers/salespersons/employees on the dealership premises. For example, using global positioning system (GPS) data or other types of position tracking mechanisms related to various client devices 720 used by the managers/salespersons/employees (e.g., smartphone devices, tablets, etc.), the locations of the managers/salespersons/employees may be identified on the dealership premises to enable certain employees to be identified/selected to assist a customer. Location data 742 may also include information associated with the locations of vehicles 310 (e.g., correlated to respective ID objects 360) on the dealership premises. In some embodiments, location data 742 may be used by service management module 738 to display a map of the dealership premises indicating the locations of vehicles 310 (including highlighting or otherwise notifying dealership personnel of specific vehicles 310 that are currently being "viewed" using ID application 420, the locations of end users/customers on the dealership premises requesting contact/assistance, and/or the locations of dealership personnel on the dealership premises.

Vehicle ID data 744 may comprise information associated with the various vehicles 310 available from the service provider/dealership. For example, vehicle ID data 744 may comprise Monroney information (e.g., such as Monroney data 430), addendum information (e.g., such as addendum data 432), or other types of information corresponding to vehicles 310. Customer data 746 may comprise information associated with various customers (e.g., end users utilizing ID application 420) that may be on-premises at the dealership and/or that were on-premises at the dealership. For example, in some embodiments, in response to launching of ID application 420 by an end user of client device 340, notification module 440 may automatically (or after receipt by an acceptance prompt from an end user of client device 340) transmit profile data 426 to manager 710 and store profile data 426 as customer data 746. Notification module 440 may also automatically (or after receipt by an acceptance prompt from an end user of client device 340) transmit showroom data 434 and/or end user vehicle data 436 to manager 710 and store showroom data 434 and/or end user vehicle data 436 as customer data 746. Thus, customer data 746 would enable the dealership to readily identify vehicles the customer is considering purchasing and/or potential vehicles as trade-ins.

Vehicle view data 748 may comprise information related to which vehicles 310 have been viewed/evaluated by end users/customers utilizing ID application 420. For example, as described above, ID application 420 may be configured to transmit in real time (or near real time) to manager 710 vehicles 310 viewed/evaluated by end users/customers to enable service management module 738 (or a dealership employee viewing vehicle view data 748) to analyze trends (e.g., based on the analysis of historical vehicle view data 748), identify customers at various locations of the dealership premises (e.g., based on the vehicle 310 being viewed), identify certain salespersons in close proximity to the end user/customer, etc. Stored vehicle view data 748 may also be analyzed from a historical perspective (e.g., as opposed to real time analysis) to determine the most common vehicles viewed, to determine the locations on the dealership premises where customers are looking, to determine/identify patterns in vehicles being considered (e.g., colors, option packages, etc.).

Key data 750 may comprise information associated with a key management/dispensing system or machine utilized by the dealership. For example, in some embodiments, the dispensing/receipt (checking out and checking in) of a key/ignition device for vehicles 310 is controlled/managed electronically and/or by computer-related implementation/machine by a dealership so that use of the keys by employees of the dealership can be monitored and/or controlled. Key data 750 may comprise information associated with the availability of a key/ignition device (e.g., whether the key has been checked out, when it was checked out, who checked it out, whether the key has been reserved, etc.).

Test data 752 may comprise information associated with a virtual test drive of a vehicle 310. For example, in some embodiments, test data 752 may comprise multimedia files that may be downloaded/transferred to test module 450 to enable a virtual test drive of a vehicle 310. However, it should be understood that multimedia content for a virtual test drive may be otherwise stored/located.

Service management module 738 may also be used to provide communications directly between dealership personnel. For example, in some embodiments, service management module 738 may interface with clients 720 to provide general announcements (e.g., via text message, email, or otherwise), communicate with particular employees (e.g., request that a particular employee go to a service desk to meet a waiting end user/customer), etc.

In the illustrated embodiment, client 720 comprises a processor unit 760 and a memory 762. Memory 762 includes a service module 770, customer data 772 and key data 774. Service module 770 is configured to interface with service management module 738 and/or key module 736 to provide/receive various types of information associated with vehicles 310, end users/customers, employees of the dealership, key/ignition devices, etc. For example, service module 770 may be used to notify a dealership employee of a request for contact by a customer (e.g., via the "contact a salesperson" 612 icon and/or "request a manager" 614 icon of ID application 420), to register the employee and/or client device 720 with service management module 738 (e.g., providing registration data 740 for location monitoring, to register an availability status of the employee, etc.), to reserve/check-out/check-in a key/ignition device for a vehicle, to acquire vehicle 310 information in response to a customer inquiry, etc. Service module 770 may be implemented in any suitable manner using known techniques that may be hardware-based, software-based, or some combination of both. For example, service module 770 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

Customer data 772 may comprise information associated with end users/customers utilizing ID application 420 (e.g., profile data 426, showroom data 434 and/or end user vehicle data 436). Customer data 772 may also include information associated with a location of a particular customer on the dealership premises (e.g., based on a current vehicle 310 being viewed). Key data 774 may comprise information associated with the availability and/or reservation/checking-out/checking-in of a key/ignition device. For example, if a particular customer would like to test drive a vehicle, an employee/salesperson may utilize service module 770 to interface with key module 736 to determine the availability of a key, to reserve a key, to check-out a key and/or to check-in a key. In some embodiments, key module 736 may be configured with proximity-detecting hardware/software (or use location data 742) to detect when a requesting salesperson (or a salesperson that has reserved a key) is in close proximity to a key dispensing location of the key machine/system to automatically dispense the key to the salesperson.

Thus, in operation, an end user/customer may launch ID application 420 on the end user's/customer's client device 340. ID application 420 will scan, listen for and/or detect signals from ID objects 360 in proximity to the end user. In response to detecting a signal from one or more ID objects 360, ID application 420 will display information associated with a respective vehicle 310 linked to the respective ID object 360. If more than one vehicle 310 is identified/detected (or even if only a single vehicle 310 is detected), ID application 420 may display a brief summary of the identified vehicle(s) 310 to enable the end user to select a desired vehicle 310 to view. Upon a selection of a desired vehicle 310, ID application 420 displays vehicle data 422 corresponding to the selected/identified vehicle 310 (e.g., Monroney data 430 and, if included, addendum data 432). ID application 420 (e.g., via one or more GUI 416 screens) enables the user to obtain/view additional information associated with the selected vehicle 310 (e.g., sales incentives, links to third party sites, etc.). Based on profile data 426 and/or other inputs received by ID application 420 from the end user/customer, the information on the selected vehicle 310 may be provided/displayed in a desired language.

In some embodiments, ID application 420 (e.g., via notification module 440) may transmit profile data 426, showroom data 434 and/or end user vehicle data 436 to service provider manager 710. Profile data 426, showroom data 434 and/or end user vehicle data 436 may be stored on manager 710 by service management module 738. Notification module 440 may also transmit any updates to profile data 426, showroom data 434 and/or end user vehicle data 436 as received (e.g., a real time (or near real time) update in response to an end user adding a new "viewed" vehicle 310 to the end user's "showroom"). ID application 420 may also be configured to automatically forward to manager 710 information associated with any "viewed" vehicle 310. Thus, in some embodiments, even outside normal business hours of the dealership, manager 710 (e.g., via service management module 738) is collecting information associated with "viewed" vehicles 310 (e.g., stored as vehicle view data 748). Service management module 738 may be configured to notify a manager/salesperson/employee of the dealership in real time (or near real time) of updates/changes to vehicle view data 748, and/or vehicle view data 748 may be made available for review and/or analysis during other times. Vehicle view data 748 may be analyzed, transformed, or otherwise manipulated by service management module 738 to identify trends, patterns, or other desired characteristics associated with the dealership and/or vehicles 310.

In response to detecting a "view" of a vehicle 310 by ID application 420, service management module 738 may alert a dealership manager, salesperson or other employee (e.g., a text, audio alert, etc., on a smartphone, tablet or other device). Service management module 738 may interface with service module 770 of a corresponding client device 720 of the employee to provide such notification. Service management module 738 may alert a particular manager, salesperson or other employee according to a desired selection/matching algorithm, according to a round-robin technique, or other method.

In response to an input from the end user via ID application 420 for contact by a salesperson or manager of the dealership, service management module 738 receives such notification from ID application 420. Service management module 738 may acquire/identify vehicle ID data 744 associated with the "viewed" vehicle 310, determine/identify a location of the vehicle 310/customer on the dealership premises, and automatically identify a particular salesperson/manager to assist the customer. For example, in some embodiments, service management module 738 may analyze registration data 740 to identify available salespersons/managers, determine which salespersons/managers have a language preference indicated by the end user/customer, identify salespersons/managers most familiar with the vehicle 310 of interest, locate/identify salespersons/managers in close proximity to the end user/customer, or apply another algorithm to identify and select a particular salesperson/manager to respond to the request. Service management module 738 may then notify the selected salesperson/manager (e.g., via a telephone call, text, or other type of alert). When notifying a particular salesperson/manager of the contact request, service management module 738 may also forward various information to the client 720 of the selected salesperson/manager (e.g., customer data 746, vehicle ID data 744 of the vehicle 310 being viewed, location data 742, etc.). In some embodiments, service management module 738 may be configured to automatically send a message to a respective ID application 420 in response to a "view" of a vehicle to inquire if the end user/customer would like some assistance (e.g., immediately, or after some predetermined amount of time).

Service management module 738 may also be used to establish a communication link between an end user/customer and a manager/salesperson. For example, an end user/customer may desire contact with a manager/salesperson via a chat dialog. Service management module 738 may initiate and manage the chat session between the customer and salesperson/manager over network 350. Service management module 738 may also manage and control other types of communications between the end user/customer and dealership personnel.

As described above, ID application 420 may also be used to search for a particular vehicle 310 and/or be used to scan a barcode or other type of indicator to obtain information about a selected/desired vehicle 310. In some embodiments, regardless of the mechanism used by an end user/customer to "view" a particular vehicle 310, ID application 420 may notify and transmit related information to service management module 738 (e.g., vehicle data 422 associated with the "viewed" vehicle 310, profile data 426, showroom data 434 and/or end user vehicle data 436).

In some embodiments, service management module 738 may also be used invoke a change to vehicle information stored as showroom data 434 and/or end user vehicle data 436 on an end user client device 340. For example, as a result of the end user purchasing a vehicle included in showroom data 434 (e.g., the "my showroom" page(s) displayable by ID application 420), service management module 738 may cause ID application 420 to transfer such vehicle information to the "my garage" page(s) displayable by the ID application 420 (e.g., now included in end user vehicle data 436). Correspondingly, if a vehicle identified and stored as end user vehicle data 436 is used as a trade-in on a new vehicle purchase, service management module 738 may cause ID application 420 to purge/delete the vehicle information from end user vehicle data 436.

Figure 8:
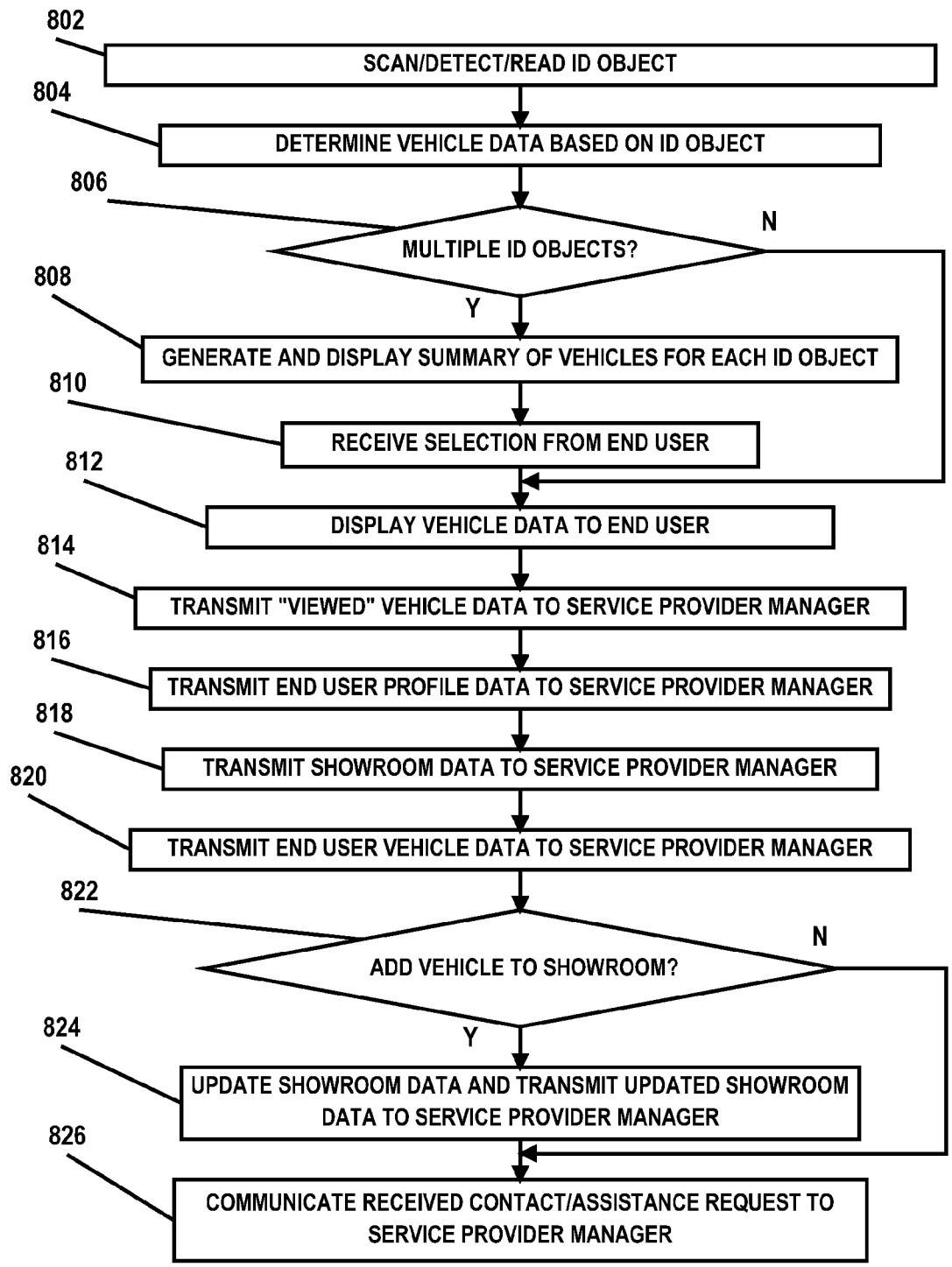
FIG. 8 is a flow diagram illustrating an embodiment of a method for vehicle information delivery and management according to the present disclosure.

FIG. 8 is a flow diagram illustrating an embodiment of a method for vehicle management. The method begins at block 802, where ID application 420 is launched and scans/detects/reads one or more ID objects 360. At block 804, ID application determines vehicle data 422 corresponding to the scanned/detected/read ID objects 360. At decision block 806, a determination is made by ID application 420 whether multiple ID objects 360 have been scanned/detected/read. If so, the method proceeds to block 808, where ID application 420 generates and displays a summary of each vehicle 310 corresponding to each scanned/detected/read ID object 360. In some embodiments, ID application 420 may prompt the end user to select a particular vehicle 310 from the summary display. At block 810, ID application 420 receives a selection of a particular vehicle 310 from the summary display. At block 812, ID application 420 displays vehicle data 422 (e.g., Monroney data 430 and, if present, addendum data 432). At block 806, if a determination is made by ID application 420 that a single ID object 360 has been scanned/detected/read, the method may proceed from decisional block 806 to block 812. However, as described above, even if a single ID object 360 has been scanned/detected/read, ID application 420 may initially provide a brief summary of the corresponding vehicle 310.

At block 814, ID application 420 transmits information regarding the "viewed" vehicle 310 to service provider manager 710. At block 816, ID application 420 transmits end user profile data 426 to service provider manager 710. For example, ID application 420 may be configured to receive and store various types of information about the end user/customer. At block 818, ID application 420 transmits showroom data 434 to service provider manager 710. Showroom data 434 may include saved/stored information of other vehicles being considered by the end user/customer (whether viewed/considered at the current dealership or a different dealership). At block 820, ID application 420 transmits end user vehicle data 436 to service provider manager 710. For example, ID application 420 may be configured to receive and store as end user vehicle data 436 information regarding vehicles currently owned by the end user/customer. End user vehicle data 436 may be used by dealership personnel to evaluate potential trade-in vehicles on a purchase of a new vehicle.

At decisional block 822, a determination is made whether the end user has added the current "viewed" vehicle 310 to the end user's "my showroom." If so, the method proceeds to block 824, where ID application 420 stores vehicle data 422 corresponding to the "viewed" vehicle 310 to the "my showroom" of the end user (e.g., adding/updating showroom data 434) and transmits the added/updated showroom data 434 to service provider manager 710. If at decisional block 822 the "viewed" vehicle 310 was not added to the "my showroom" of the end user, the method proceeds to block 826. At block 826, ID application 420 communicates any received request from the end user for contact/assistance (e.g., a request for contact from a salesperson, manager, etc.) to service provider manager 710.

Figure 9:
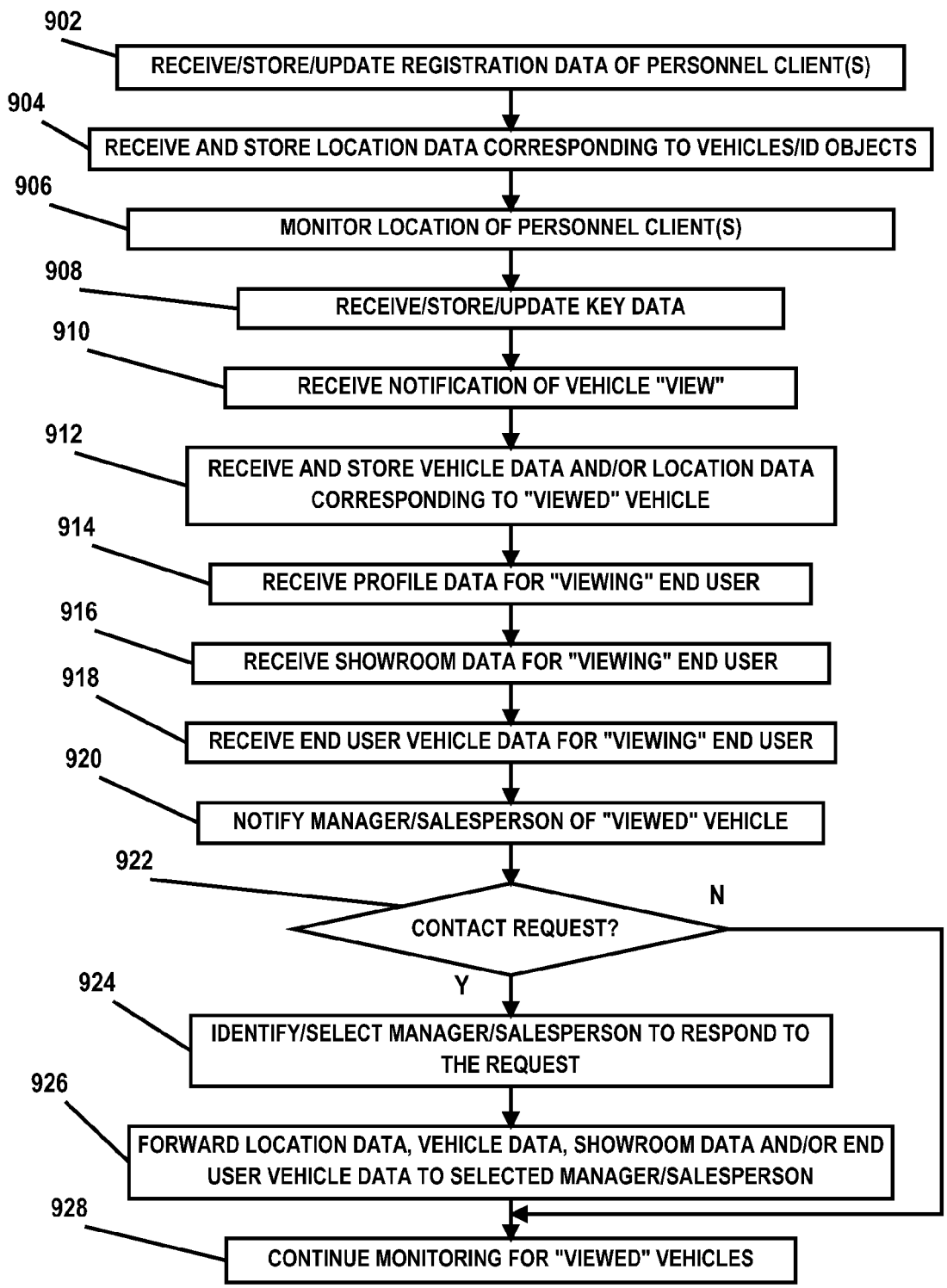
FIG. 9 is a flow diagram illustrating another embodiment of a method for vehicle information delivery and management according to the present disclosure.

FIG. 9 is a flow diagram illustrating another embodiment of a method for vehicle management. The method begins at block 902, where service management module 738 receives, stores and/or updates registration data 740 corresponding to dealership employees/clients 720. For example, as described above, employees of the dealership may register their client 720 devices and/or otherwise provide status information of their presence/availability to assist end users/customers. At block 904, service management module 738 receives and stores location data corresponding to vehicles 310 corresponding to respective ID objects 360. For example, service management module 738 may store location information corresponding to the vehicle 310 locations to enable such location information to be displayed on a dealership premises map or otherwise.

At block 906, service management module 738 monitors the location and/or availability of personnel of the dealership. For example, personnel may utilize service module 770 on respective clients 720 to update their availability status, which is thereby communicated to service management module 738. Service management module 738 may also use GPS data and/or other location monitoring techniques to monitor the locations of dealership personnel on the dealership premises. At block 908, service management module 738 receives, stores and/or otherwise updates key data 750 for vehicles 310. For example, personnel may utilize service module 770 on respective clients 720 to interface with key module 736 to determine the availability of a key/ignition device for a particular vehicle 310, check-in/check-out a key, and/or reserve a key.

At block 910, service management module 738 receives a notification (e.g., from ID application 420 of a particular end user's client device 340) of a "viewed" vehicle by such end user. At block 912, service management module 738 receives and stores vehicle ID data 744 and/or location data 742 corresponding to the "viewed" vehicle. At block 914, service management module 738 receives profile data 426 from ID application 420 corresponding to the "viewing" end user. At block 916, service management module 738 receives showroom data 434 (if available) from ID application 420 corresponding to the "viewing" end user. At block 918, service management module 738 receives end user vehicle data 436 (if available) from ID application 420 corresponding to the "viewing" end user. At block 920, service management module 738 notifies desired personnel of the dealership (e.g., manager, salesperson, etc.) that a vehicle 310 has been "viewed."

At decisional block 922, a determination is made whether a contact or assistance request has been received from the end user via a respective ID application 420. If so, the method proceeds to block 924, where service management module 738 may identify/select a particular manager/salesperson/employee to respond to the request. For example, in some embodiments, service management module 738 may receive (e.g., as part of profile data 426 or otherwise) an indication of a language preference or other desired characteristic. Service management module 738 may search registration data 740 to locate available employees of the dealership having the desired language capability. Service management module 738 may also determine and/or otherwise identify certain available employees most knowledgeable about the "viewed" vehicle of interest, closest in proximity to the vehicle 310/end user, or other selection criteria. Thus, in some embodiments, service management module 738 may be configured to execute a search/matching algorithm to identify/select a desired and/or best employee candidate for responding to the end user request.

At block 926, service management module 738 forwards to the selected dealership employee (e.g., communicating and/or interfacing with service module of client 720 of the employee) location data 742, vehicle ID data 744, showroom data 434 and/or end user vehicle data 436 to enable the selected employee to best respond to the end user request. If at decisional block 922 a determination is made that no contact request has yet been received from an end user/customer, the method proceeds to block 928. At block 928, service management module 738 continues monitoring for indications of "viewed" vehicles 310 by end users/customers.

Thus, embodiments of the present invention enables the efficient management of vehicle information delivery and service. For example, as indicated above, system 300 enables an end user to retrieve and store electronic versions of Monroney and/or other vehicle information corresponding to a desired or "viewed" vehicle, including in a desired language, thereby enabling the Monroney sticker to be removed and/or omitted from the vehicle (which may decrease the likelihood of vehicular accidents during test drives due to impaired visibility from the Monroney sticker). The end user, utilizing ID application 420, may store a variety of types of information for various vehicles (e.g., from one or more vehicle service providers/dealerships) for later evaluation/retrieval. Further, modules/applications residing on and/or made available to various personnel at the service provider/dealership enables such personnel to more efficiently respond to and provide service to the end user/customer. For example, in some embodiments, personnel most closely matching various criteria for responding to an end user/customer request can be identified and selected. Further, data acquired corresponding to which vehicles 310 have been viewed (during and/or after normal business hours) may better enable the dealership to gauge consumer interest in particular vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:
1. A system, comprising:
 a service provider manager comprising a processor unit and a service management module, the service management module executable by the processor unit to:
  receive a notification from an application executing on a client device of an end user that vehicle data corre- sponding to a vehicle being viewed by the end user has been displayed to the end user;

receive registration data corresponding to personnel of a service provider, the registration data comprising availability status information of the respective personnel;

monitor a location of the respective personnel on a premises of the service provider; and notify at least one of the personnel of the service provider of the notification; and a key module executable by the processor unit to cause an ignition-enabling device for operation of the vehicle viewed by the end user to be dispensed from a key management machine of the service provider.

2. The system of claim 1, wherein the service management module is configured to:

receive a request for assistance from the end user; and analyze the registration data to identify and select the at least one of the personnel to respond to the request.

3. The system of claim 2, wherein the service management module is configured to forward to the selected at least one of the personnel the vehicle data corresponding to the vehicle being viewed by the end user.

4. The system of claim 1, wherein the service management module is configured to:

receive a request for assistance from the end user; and analyze the location of the personnel to identify and select the at least one of the personnel in close proximity to the end user to respond to the request.

5. The system of claim 1, wherein the service management module is configured to:

receive profile data from the application corresponding to the end user; and receive showroom data from the application, the showroom data indicating one or more vehicles previously viewed by the end user.

6. The system of claim 1, wherein the service management module is configured to:

receive a request for assistance from the end user;

select at least one of the personnel to respond to the request; and notify the selected at least one of the personnel to respond to the request.

7. A method, comprising:

receiving, by a management module of a service provider manager associated with a service provider, a notification from an application executing on a client device of an end user that vehicle data corresponding to a vehicle being viewed by the end user on a premises of the service provider has been displayed to the end user;

storing, by the management module, the vehicle data corresponding to the viewed vehicle;

storing, by the management module, a time that the vehicle was viewed by the end user;

notifying, by the management module, at least one employee of the service provider of the notification;

receiving, by the management module, profile data corresponding to the end user;

forwarding, by the management module, the profile data to the at least one employee; and causing, by the service provider manager, an ignition-enabling device for operation of the vehicle viewed by the user to be dispensed from a key management machine of the service provider.

8. The method of claim 7, further comprising:

receiving, by the management module, registration data corresponding to personnel of the service provider, the registration data comprising availability status information of the respective personnel; and monitoring, by the management module, a location of the respective personnel on the premises of the service provider.

9. The method of claim 7, further comprising:

receiving, by the management module, registration data corresponding to personnel of the service provider, the registration data comprising availability status information of the respective personnel;

receiving, by the management module, a request for assistance from the end user;

selecting, by the management module, at least one of the personnel to respond to the request; and notifying, by the management module, the selected one of the personnel to respond to the request.

10. The method of claim 9, further comprising forwarding, by the management module, the vehicle data corresponding to the vehicle being viewed by the end user.

* * * * *